United States Patent [19]

Kudelski et al.

[11] Patent Number: 5,144,663
[45] Date of Patent: Sep. 1, 1992

[54] METHOD OF INTERACTIVE COMMUNICATION BETWEEN A SUBSCRIBER AND A DECODER OF A SYSTEM OF PAY-TELEVISION AND DECODER THEREOF

[75] Inventors: André Kudelski, Crissier; Laurent Laffely, Le Mont-sur-Lausanne; Marco Sasselli, Chardonne, all of Switzerland

[73] Assignee: Kudelski S.A. Fabrique D'Engregistreurs Nagra, Cheseaux, Switzerland

[21] Appl. No.: 613,940

[22] Filed: Nov. 13, 1990

Related U.S. Application Data

[63] Continuation of Ser. No. 488,493, Mar. 6, 1990, abandoned, which is a continuation of Ser. No. 38,727, Apr. 15, 1987, abandoned.

[30] Foreign Application Priority Data

Apr. 18, 1986 [CH] Switzerland ............... 1576/86

[51] Int. Cl.$^5$ ............... H04N 7/167; H04K 1/00
[52] U.S. Cl. ............... 380/16; 358/84; 380/14; 380/20; 380/23; 380/24
[58] Field of Search ............... 358/84; 380/14, 16, 380/20, 23, 24, 25

[56] References Cited

U.S. PATENT DOCUMENTS

| | | |
|---|---|---|
| 4,225,884 | 9/1980 | Block et al. |
| 4,337,483 | 6/1982 | Guillou |
| 4,536,791 | 8/1985 | Campbell et al. |
| 4,595,950 | 6/1986 | Lofberg |
| 4,599,647 | 7/1986 | George et al. |
| 4,605,961 | 8/1986 | Frederiksen ............... 380/14 |
| 4,696,034 | 9/1987 | Wiedemer |
| 4,712,238 | 12/1987 | Gilhousen et al. ............... 380/20 |
| 4,751,732 | 6/1988 | Kamitake ............... 380/20 |
| 4,796,297 | 1/1989 | Okamoto ............... 380/10 |
| 4,797,918 | 1/1989 | Lee et al. ............... 380/20 |

FOREIGN PATENT DOCUMENTS 8601962 3/1986 World Int. Prop. O. ............... 380/10

Primary Examiner—Stephen C. Buczinski
Attorney, Agent, or Firm—Marks & Murase

[57] ABSTRACT

A decoder comprising a microprocessor connected to a receiver of data of teletext and to a text generator for displaying information on the screen of a television receiver. Further, a CPTV-card (card pay-television) is associated with the microprocessor, this card managing the credit necessary for the purchase of emissions, for the memorization of the emissions purchased and for permitting the unscrambling of the emissions purchased by delivering to the microprocessor the input pointer in the sequence which is calculated by the microprocessor by means of the information which has been memorized as well as the information delivered by the decoder. The programs of the forecasted emissions are transmitted by the head station and memorized in the microprocessor of the decoder. Another memory of the microprocessor contains the instructions for the manipulations to be effected for selecting an emission and for purchasing it as well as for recharging a credit in the CPTV-card. A keyboard permits selection and display on the screen of the television receiver of the forecasted emissions as well as the instructions of manipulation which enormously facilitates the dialog between the user and the decoder and contributes to avoiding errors of manipulation. The decoder according to the invention operates as a guide for the user, for all operations to be effected.

3 Claims, 5 Drawing Sheets

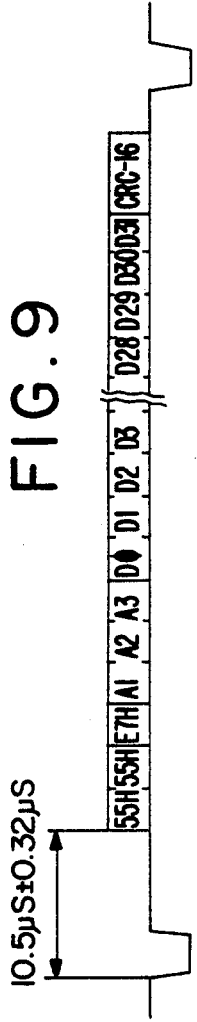

METHOD OF INTERACTIVE COMMUNICATION BETWEEN A SUBSCRIBER AND A DECODER OF A SYSTEM OF PAY-TELEVISION AND DECODER THEREOF

This application is a continuation of application Ser. No. 07/488,493 filed Mar. 6, 1990, which in turn is a continuation of application Ser. No. 07/038,727 filed Apr. 15, 1987.

BACKGROUND OF THE INVENTION

The present invention relates to a method for faciltating the dialog between a subscriber to a system of pay-television (pay-TV) and a decoder of the signals received. It relates also to this decoder.

In a pay-TV system or similar systems, the subscriber selects the programs of interest and he pays for receiving these programs which are transmitted in a scrambled or encoded mode in order not to be recognizable to non subscribers or to subscribers who have not chosen nor paid for a particular program. The signals may be transmitted by cable, antenna or satellite. The sophisticated systems of pay-TV further allow for the possibility of "pay-per-view" which permits a subscriber to purchase programs either immediately before the beginning of the emission or during the emission itself and this by means of an unidirectional transmission system. In this case, it becomes necessary to memorize a certain credit at the location of the user, credit which is available for permitting the user to purchase and receive an emission pay-per-view that the user desires. If the memorized credit is sufficient, the amount is debited from the credit and the signal received from the transmitting station is unscrambled or decoded for permitting a comfortable reception thereof.

The document WO 81/02499 relates to a method and a system for scrambling the transmission of video information, more particularly for pay-TV. Parts of the video signal, e.g. parts or segments of the lines or of the frames are transmitted in a sequence different from the natural one. The manner of rearranging the sequence of the segments of lines for the transmission may be controlled by a code generator which changes the sequence at each frame or even as a function of another appropriate time base. The code which can be enciphered changes at random and it may be transmitted completely or partially with the scrambled video signal.

The U.S. Pat. No. 4,484,217 relates to a method and a system for billing at a distance a program of pay-TV. The credit available is memorized at the location of the subscriber and a cost signal is transmitted by the transmitter. Pay-per-view is made possible by the fact that there is foreseen an impulse purchase. A unique code may accompany the transmitted signal for identification purpose. If the decoder of the subscriber recognizes the program as a program purchased by impulses, the program cost is displayed. In order to visualize the program, the subscriber enters an adequate demand in the decoder and the latter compares automatically the cost of the program with the credit available. If the cost does not exceed the credit, the program is unscrambled and the cost is deducted from the credit. However, such, a system does not foreseeably display in the form of teletext transmitted by the video signal information relating to the forecasted emissions in their chronological order nor display information in the form of instructions for the manipulation to be executed by the user on the decoder, in order to facilitate the dialog between the latter and the user and to avoid manipulation errors.

SUMMARY OF THE INVENTION

It is therefore an object of the present invention to facilitate and to improve the dialog between a subscriber to a pay-TV system and a decoder of the signals received. Moreover, the decoder must permit an easy and rapid recharging of the credit by the subscriber without the necessity of consulting the administration or management center.

To solve this problem, the method according to the present invention for facilitating the dialog between a subscriber to a system of pay-TV and a decoder of the signals received is characterized in that one memorizes information transmitted by teletext regarding programs of emissions, in that one selects by menu with a keyboard of the decoder the memorized information and in that one uses the memorized information for controlling a text generator which permits the display of the information on the screen of the television receiver, the display of the information facilitating the dialog between the subscriber and the decoder.

The decoder for facilitating the dialog between itself and a subscriber to a system of pay-TV is characterized in that, it comprises a receiver of data of teletext which permits the extraction of information from the transmitted video signal, a microprocessor with at least one memory for the extracted information delivered by the receiver of data of teletext, a text generator controlled by the microprocessor and capable of displaying on the screen of a television receiver said memorized information selected by menu by means of a keyboard connected to the microprocessor.

Due to the fact that one memorizes in the decoder of the subscriber the information transmitted by teletext regarding the programs of forecasted emissions, like title of the emission, price, date of transmission, code number, etc. and that this information can be selected by menu by means of the keyboard of the decoder and displayed by a text generator on the screen of the television receiver, there exists a possibility of dialog between the subscriber and the decoder, the latter being a user's guide for all operations or manipulations to be executed.

BRIEF DESCRIPTION OF THE DRAWINGS

The invention will be described further by means of an example of execution illustrated in the drawings.

FIG. 9 shows the physical structure of a line of the video signal where data is inserted, FIG. 10 shows the structure of the physical data in the Didon-operating system.

DETAILED DESCRIPTION OF THE INVENTION

Figure 1:
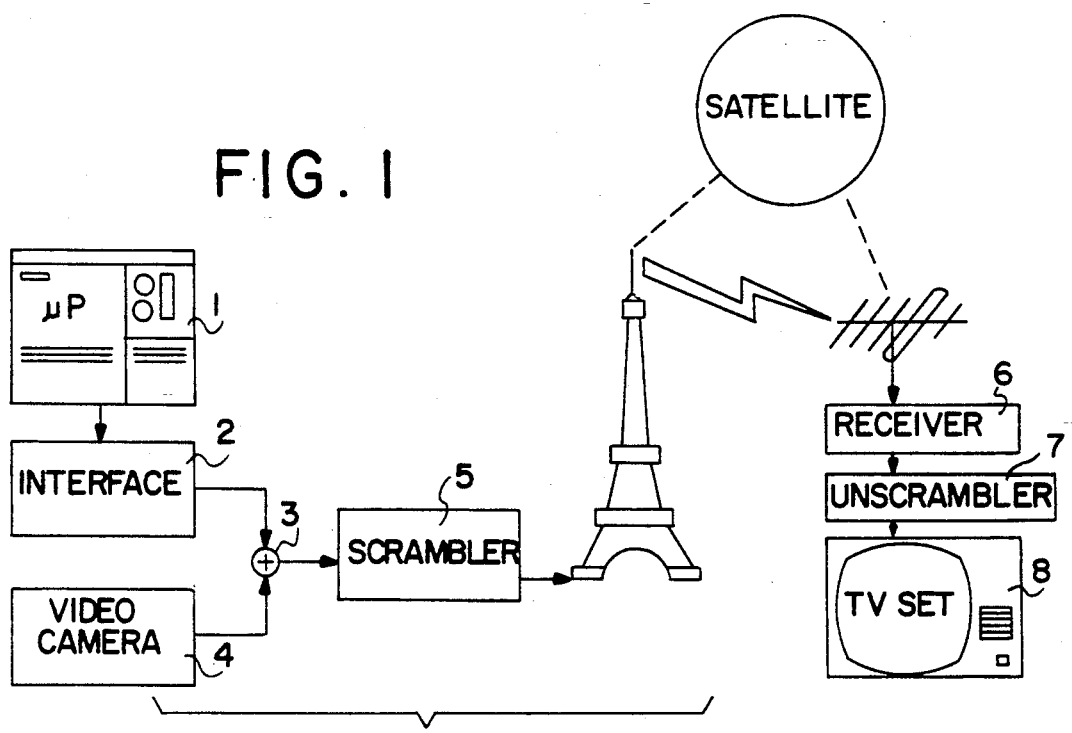
FIG. 1 shows the fundamental principle of a system of pay-TV.

FIG. 1 shows a microcomputer 1 provided for generating data according to a format of teletext regarding the program of the forecasted emissions, like title, price, date or period of transmission, etc. as well as other information useful for the user. This data is introduced or superimposed at 3 through an interface 2 in the video signal delivered by a known television camera 4 or any other element capable of generating a video signal. The lines corresponding to the return of the vertical scanning of the video signal which carry normally no information are used in the system according to the invention as a support for data of teletext so that its data is transmitted with the video signal. FIG. 9 and Table 1 show the structure of a return line of the vertical scanning of the video signal.

TABLE 1

| Characteristics | | Hex. Value | Hamming Byte | | | | | | | |
|---|---|---|---|---|---|---|---|---|---|---|
| Transmission rate: | 6,203,125 Mbit/s | 0 | 0 | 0 | 0 | 1 | 0 | 1 | 0 | 1 |
| Code: | NRZ, AM | 1 | 0 | 0 | 0 | 0 | 0 | 0 | 1 | 0 |
| Pulse-shaping: | Square sin. | 2 | 0 | 1 | 0 | 0 | 1 | 0 | 0 | 1 |
| Line of data: | 320 bits - 40 bytes | 3 | 0 | 1 | 0 | 1 | 1 | 1 | 1 | 0 |
| Order data succession: | Lsb . . . Msb; LsB . . . MsB | 4 | 0 | 1 | 1 | 0 | 0 | 1 | 0 | 0 |
| Synchro. PLL: | 2 × 55 H | 5 | 0 | 1 | 1 | 1 | 0 | 0 | 1 | 1 |
| Synchro. byte: | E7 H | 6 | 0 | 0 | 1 | 1 | 1 | 0 | 0 | 0 |
| Address: | A1, A2, A3 bytes in | 7 | 0 | 0 | 1 | 0 | 1 | 1 | 1 | 1 |
| | Hamming code | 8 | 1 | 1 | 0 | 1 | 0 | 0 | 0 | 0 |
| Protection: | The 32 bytes are | 9 | 1 | 1 | 0 | 0 | 0 | 1 | 1 | 1 |
| | protected by 2 bytes | A | 1 | 0 | 0 | 0 | 1 | 1 | 0 | 0 |
| | of CRC-16 | B | 1 | 0 | 0 | 1 | 1 | 0 | 1 | 1 |
| | | C | 1 | 0 | 1 | 0 | 0 | 0 | 0 | 1 |
| | | D | 1 | 0 | 1 | 1 | 0 | 1 | 1 | 0 |
| | | E | 1 | 1 | 1 | 1 | 1 | 1 | 0 | 1 |
| | | F | 1 | 1 | 1 | 0 | 1 | 0 | 1 | 0 |

One sees that the line allows for 32 bytes of data of teletext besides instructions of synchronization and addresses in Hamming code. The 32 bytes are protected by 2 bytes of CRC-16 error detection code. The video signal with the data of teletext is then delivered to a scrambler 5 which scrambles the image, e.g. by changing the sequence according to which the lines are normally transmitted or by other means. The scrambled signal is transmitted wireless, by video cable or by satellite to the receiver 6 of the subscriber. The receiver allows for a circuit 7 for unscrambling which delivers the unscrambled signal to the television receiver 8.

The scrambled signal is fully compatible with the SECAM and PAL(NTSC) norms. The scrambling may be executed in normal version or in deep version. In the normal version, the lines of the video signal are permuted between themselves, the active part only of the line being permuted. In the SECAM system, an even line is permuted with an even line and an odd line is permuted with an odd line. In the PAL(NTSC) system, the burst is left unchanged. Each line is sampled and digitalized on 8 bits with a sampling frequency $f = 3 \times f_{burst}$ or $f = 4 \times f_{burst}$ synchronous to the burst so that in the PAL(NTSC) system the phase of the color is preserved. Each line is thus divided in principle in 3 (or 4) > 256 segments of 8 bits each.

Figure 2:
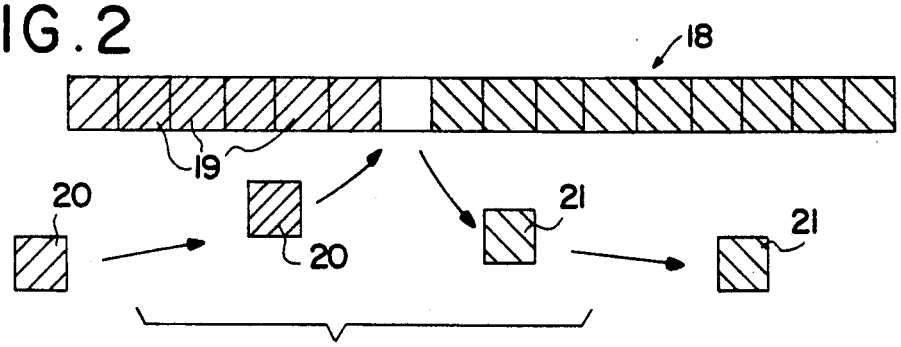
FIG. 2 shows schematically the principle of entry and extracting of a line of the video signal in a buffer of 32 lines.
Figure 4:
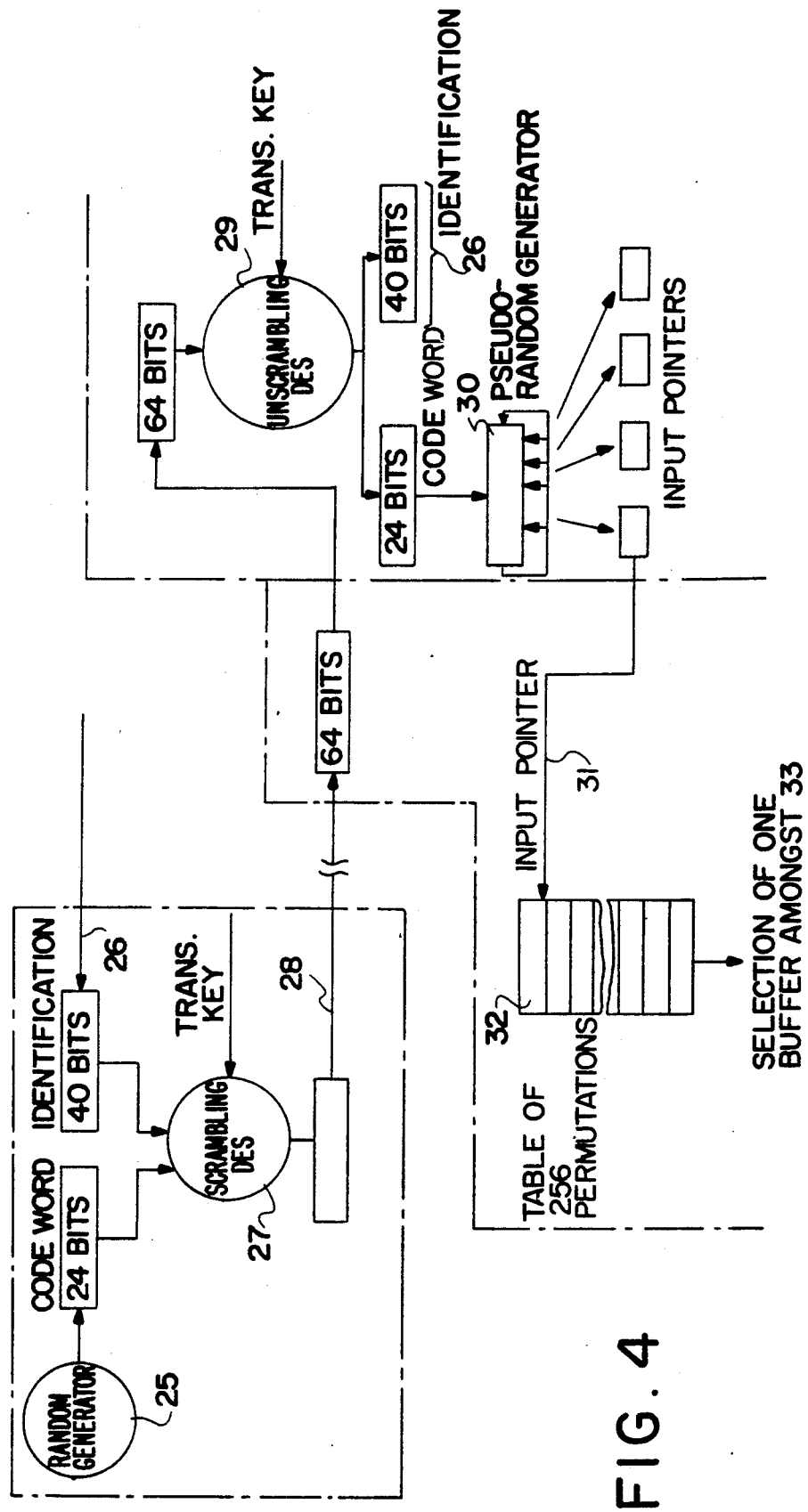
FIG. 4 shows the principle of scrambling and unscrambling of the video signals transmitted.

FIG. 4 shows the principle of scrambling and unscrambling of the video signals transmitted. At the emission side, a random generator 25 generates code words in real time. Information 26 relating to the identification to be transmitted is delivered with a transmission key and the code word to an enciphering system 27 e.g. the system DES which delivers in real time the enciphered data 28 to be transmitted. The key may be transmitted in enciphered form. At the receiving side, the transmitted signal together with the transmission key is delivered to the deciphering system 29 e.g. of the card CPTV which delivers the deciphered code word (provided however that the emission in progress has been purchased) and the information of identification 26. The code word controls a pseudo-random generator 30 which in its turn delivers input pointers 31 for a table 32 of 256 codes of permutation. At each line of the video signal, the table selects among 33 buffers the one which permits the de-permutation of the lines. It is possible to enter and to extract from the buffers the lines in any desired order. FIG. 2 shows schematically a memory buffer 18 which memorizes the 3 × 256 segments 19 of 8 bits forming one line of the video signal. In this memory, the segments or samples are entered sequentially in successive locations or positions of the memory. FIG. 2 shows that the introduction of a new segment 20 in one of the positions of the memory liberates the segment 21 which was previously memorized at this position so that the memory is always filled with 32 lines and that a buffer is always filled with 3 × 256 segments. The scrambling/unscrambling as indicated above provides an excellent safety against piracy for the following reasons:

The number of possible permutations of the lines is very great so that it is difficult to find the "right combination", either at random or by correlation.

The code or key of permutation is transmitted in real time so that even if a pirate finds the right combination, this one is only valid for a very short instant of time, e.g. one second.

The code for the permutation is transmitted in enciphered form, e.g. according to the system DES but not exclusively, this system DES being practically unbreakable.

The deciphering of the codes of permutation takes place as will be seen later in a "smart" card (car pay television or card CPTV) comprising a microprocessor. It will be seen that this card guarantees a complete safety. As an alternative, the microprocessor of the card may be one of the elements of the decoder.

The CPTV-cards are reprogrammable which permits change periodically of the keys of encoding.

Figure 5:
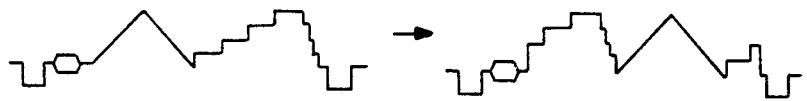
FIG. 5 shows the rotation of a line of the video signal.

In the version of deep scrambling, one effects the following scrambling in addition to the permutation of the lines as mentioned above:

In accordance with FIG. 5, a rotation of the active part of the line about itself, which means that the active part of the line starts e.g. in the middle of the true line and is followed, after the end of the true line, by the beginning of this same line.

Figure 6:
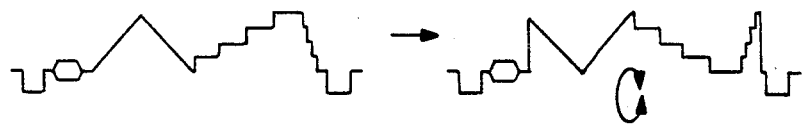
FIG. 6 shows the inversion of a line of the video signal.

In accordance with FIG. 6, an inversion of the polarity of the active line with respect to the level corresponding to 50 IRE. This operation permits an automatic adjustment of the level of luminosity for maintaining it constant. This permits the suppression of the possibility of image recognition by changing the ambient lightning.

Figure 7:
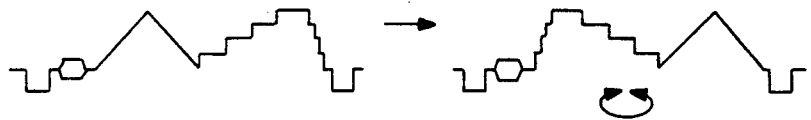
FIG. 7 shows a mirror symmetry of a line of the video signal.

In accordance with FIG. 7, a mirror symmetry of the video line according to which the active part of the video line is submitted to an axial symmetry around an axis perpendicular to the black level of the video signal.

It is remembered that the scrambling affects only the active part of the line, this active part being permuted as well as the lines corresponding to the return of the vertical scanning which permits the scrambling of the data of teletext, but in all cases the horizontal synchronizing pulses remain unchanged. At the output of the buffer, the data is converted in an analog signal by a digital/analog converter of 8 bits. One obtains thus an unscrambled SECAM or PAL(NTSC) signal for being displayed on the screen of the television receiver. Let us examine now the principle of the decoder and its possible applications.

Figure 3:
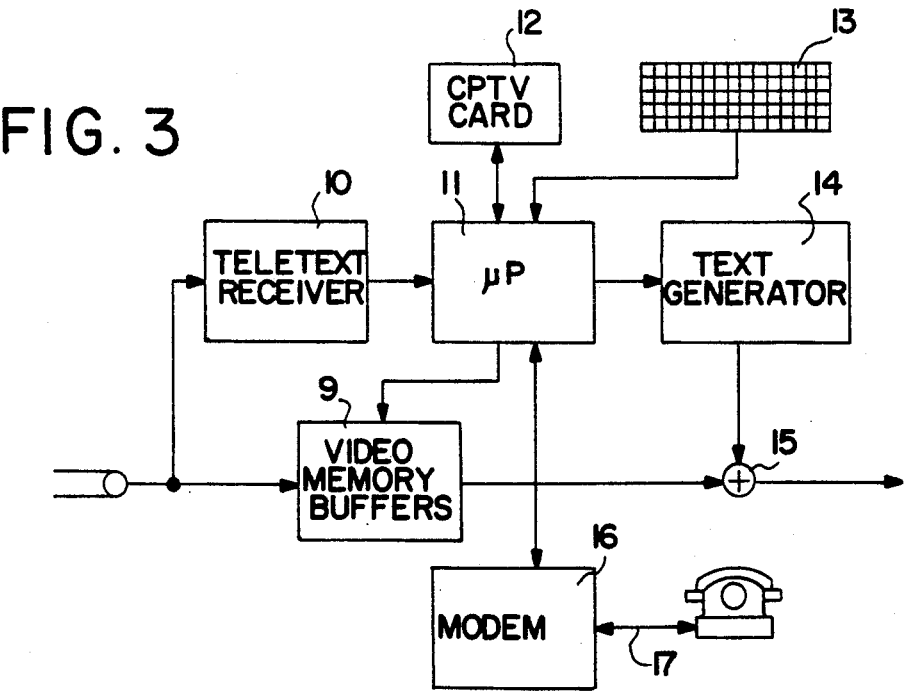
FIG. 3 shows a block diagram of the decoder according to the invention.

FIG. 3 shows that the video signal from the transmitting station is delivered to the buffer 9 of 32 lines which permits de-permuting the lines as indicated above, and to a receiver of data of teletext 10. It has been shown that the data in the format of teletext is superimposed on the video signal so that it is transmitted at the same time and through the same channel than the video signal. This data is transmitted by the lines corresponding to the return of the vertical scanning of the video signal. A microprocessor 11 is the central element of the decoder. It comprises dead and live memories for all information which may be displayed on the screen of the television receiver, these informations which are in format of teletext being partly transmitted by the transmitting station or head station and memorized in a live storage unit of the microprocessor and partly memorized in a dead storage unit of the microprocessor 11. The microprocessor is associated with a safety card called CPTV-card (card pay television) 12 normally inserted in the decoder and to a keyboard 13 of the decoder. The microprocessor delivers, in response to actuation of the keyboard, the data of teletext in an adequate numerical form to a text generator 14 which controls the display on the screen of the television receiver. The microprocessor 11 controls in cooperation with the CPTV-card 12 the buffer 9 for de-permuting the lines as mentioned previously. The unscrambled video signal as well as the signal of the text generator are at disposal at 15 for being displayed by the television receiver. Further, the microprocessor is also connected to a modem 16 coupled to a telephone line 17.

Let us examine now in more detail the possibilities of the above described decoder.

Figure 8:
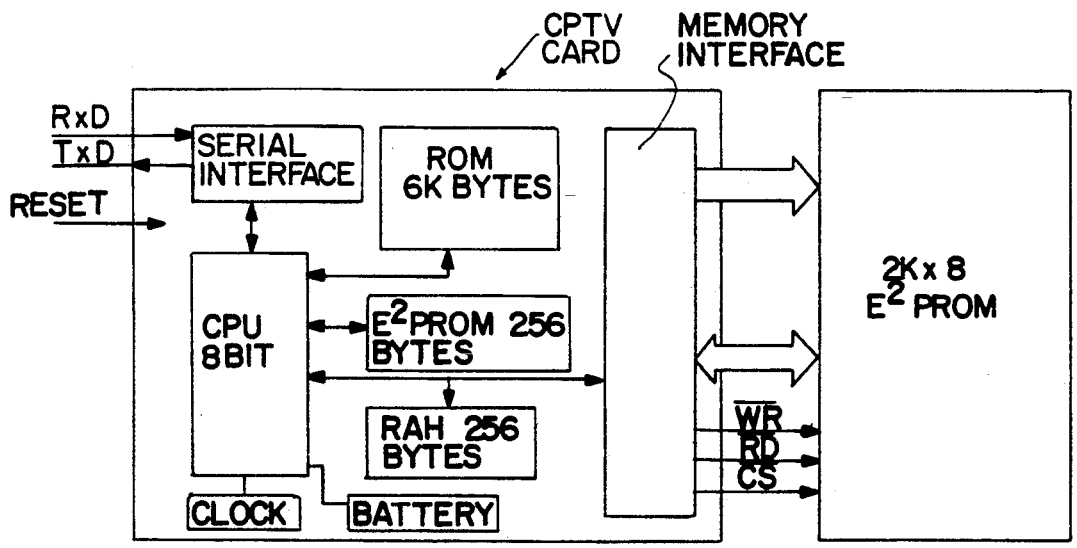
FIG. 8 is a block diagram of the CPTV-card.

The CPTV-card is an active card comprising a microprocessor with a non volatile memory (RAM with battery, NVRAM or E2PROM) which is illegible from the outside (safety), and a clock. In accordance with FIG. 8, the card allows for two electronic parts: a security device with a CPU and the associated memories like ROM, E2PROM, RAM as well as a memory interface and a separate E2PROM memory of 2 Kbytes. The card is in principle in form of a credit card. It allows for the four following functions:

Decoding of the permutation key which is enciphered at the transmission side e.g. according to the system DES. The card receives from the microprocessor 11 the enciphered key and returns, when the emission has been purchased, to the microprocessor the deciphered key permitting de-permutation of the lines of the video signal.

Memorizing of the list of numbers or codes of the emissions which have been purchased as well as of the subscriptions to a particular sort of emission (sport, culture, cinema, cooking, etc). This memorization of the list of the emissions which have been purchased permits the CPTV-card to return to the microprocessor the deciphered key only if the emission has really been purchased. Further, and for statistical purposes as well as for invoicing, it is possible to have a knowledge of the emissions purchased.

Management of the credit. The CPTV-card memorizes information representative of the credit which is at disposal for purchasing emissions or subscriptions. In order to purchase an emission, the user visualizes by action on the keyboard 13 the list of the forecasted emissions which have been received previously from the head station and are memorized in the microprocessor 11 of the decoder. These memorized emissions are selected by menu and displayed on the screen of the television receiver 8. The television receiver displays in addition to the title of the emission, its number, its price, the date of emission and other useful information if necessary. Then, the user selects the number of the desired emission or subscription by actuating the corresponding keys of the keyboard. If the credit at disposal which is memorized in the card is sufficient for purchasing the desired emission or subscription, the latter is purchased and its number is immediately memorized in the card on the list of the emissions purchased and the corresponding amount is deducted from the memorized credit available. When the purchased emission is broadcasted, it is identified by the card by comparison with its number or code registered on the list of the purchased emissions and the card delivers to the microprocessor the code or key for unscrambling.

The fourth function of the CPTV-card is a function of measurement of time by means of its clock. This function is used in relation with certain emissions, e.g. emissions of interactive games between the user and the head station as described later on.

One sees that the card distinguishes over the cards from the prior art in that it memorizes all confidential or secret information which is necessary to unscramble the video signal with the data of teletext, like the key for unscrambling and the credit available. The card manages the credit, memorizes the emissions purchased and permits the unscrambling of the purchased emissions. It may be reset and the whole memorized data may be changed. It is thus possible to modify the keys for unscrambling and to reuse the card after it has been newly programmed.

For all operations to be effected, the user is guided by the decoder itself which displays on the screen of the television receiver by means of the text generator 14 texts and instructions for actuating the keyboard. For this purpose, part of the information which is capable of being displayed in the form of text is memorized permanently in a dead memory of the microprocessor 11, this part of the information corresponding in principle to the instructions of actuation of the keyboard and the other part of the information is temporary memorized in a live memory of the microprocessor 11, this second part of the information being transmitted by the head station and concerning more particularly the forecasted programs. The following possibilities are offered to the user:

Display of the titles, prices, etc of the forecasted programs,
Guide for the purchase of the forecasted emissions,
Guide for the purchase of subscriptions (windows/channels),
Guide for the auxiliary functions of the decoder,
Dialog with the decoder, clearly intelligible for the user,
Reception of messages (private, general)
Reception of standard teletext.

The preceding shows that the dialog between the user and the decoder is enormously facilitated by the decoder according to the present invention.

Further, the decoder is particularly well adapted for the purchase of an emission by the user, directly from his home or location. The purchase of this emission be is effected by the user in dialog with the decoder (pay-per-view), without any transmission of information to the head station or administration center. Thus, all purchasing operations are effected in the CPTV-card, the decoder being capable of understanding the orders given by the user and to transmitting them to the CPTV-card. To this purpose, the user selects simply by means of the keyboard, the title of the desired emission by typing the number of this emission and by actuating a key "validate". If the credit contained in the CPTV-card is sufficient, the number or the code of the selected emission or subscription is memorized in the list of emissions purchased, the corresponding amount is deducted from the credit available in the card and, when the emission purchased is broadcasted, the card delivers to the microprocessor the code for unscrambling the emission. This principle permits avoiding an overload of the telephone lines and permits the user to purchase at any time an emission, even if it is already in progress (pay-per-view).

If the credit available in the card is null or insufficient for permitting the purchase of a desired emission or subscription, a new credit or an increase of the credit still available may be recharged, and added in accordance with the following possibilities:

Purchase by the user at the administration center of a code (e.g. of 9 ciphers) corresponding to the amount of the credit to be reloaded and reload of the credit by inserting this code in the decoder, the new credit being memorized in the CPTV-card.

By postal exchange of the card at regular intervals of time which permits the head station to know which programs have between viewed (statistics).

Reload of the credit in sales point (video club, bank) which also permits knowledge of which programs have been viewed.

By remote control: credit may be reloaded in the card by wireless or by cable upon order of the head station.

Possible applications of the decoder according to the invention are as follows:

Display of menus for the purchase of subscription programs with the possibility of knowing at all times the programs purchased, these programs being designated by a particular sign (letter, cipher), display of the credit still at disposal, display of the date of expiration of the subscriptions, display of the total offer from the head station including updating of the programs which will be transmitted at a later date and modifications of the conditions by groups of subscribers, etc. All of this information which is delivered by the receiver of data of teletext (10) is memorized in the microprocessor 11 and displayed upon request on the screen of the television receiver by the text generator 14.

Interactive games: This concerns as an example a game of lotto with the head station, the user taking part of the game by staking a number and by inserting the corresponding amount by the keyboard. The number and the amount are memorized in the CPTV-card. The winning number drawn at the transmission side is transmitted by the video signal in enciphered form as data of teletext and if it corresponds to the number staked by the user, the latter is authenticated by the CPTV-card by means of its internal clock which determines exactly the time which has elapsed between the stake and the control of the winnings in order to avoid fraud, being well understood that the stake must precede the drawing at the emission side. If the player is a winner, the decoder calls the station of emission by means of the modem 16 and the winnings is gratified in form of an increase of the credit in the CPTV-card, this increase being controlled by the head station (see under).

Reception of private messages transmitted by the head station. These messages are broadcasted in a format of teletext and the decoder verifies that it is itself the right one which is entitled to receive the message. To this purpose, each CPTV-card allowa for a memorized particular identification number which is transmitted by the head station with each message. If the decoder is the one to which the message is addressed, the CPTV-card permits the display of the message on the screen of the television receiver.

Safety code. This is a code provided for preventing non authorized persons, e.g. children, from purchasing emissions or subscriptions, the amount of which exceeding a predetermined amount, or that these children are prevented from taking part in games which are not intended for them. In this case, it is necessary to introduce by means of the keyboard a safety code into the decoder as a pass word. If the latter is not introduced or if it is not correct, the decoder will not execute the orders which are given to it.

Connection by modem. Thanks to the modem 16 connected to the microprocessor 11 and to a telephone line 17, it is possible for the decoder in which the CPTV-card is inserted, to call automatically the head station, e.g. during the night (due to the presence of the clock of the CPTV-card) in order to be recharged by a new credit if the former one is already exhausted. At the same time, the decoder transmits to the head station the set of the emissions which have been viewed. If desired, the decoder may call the head station periodically, at fixed dates.

The decoder may be used as a receiver of standard teletext.

As an example of the organization of the data in the lines of the video signal, FIG. 10 shows the structure of the physical data in the case of the data transmission system Didon (French). One line L0, L1 L2, L3, or L4 is transmitted at each frame of the video signal. Thus a group of 5 lines (Lo to L4) is transmitted every 5 frames. One sees more particularly that the lines L2 and L3 transmit pages of data of 32 Bytes each. The addressings B0 to B5 permit selection of one group of subscribers among $2^{24}$ groups of 240 subscribers. The addressings comprise the number of the group, the action to be executed, e.g. the recharging of credit, and the list of the subscribers which are concerned by the particular action. The synchronization is ensured by a CRC-16 as shown. Further, each line is protected by a CRC-16 which permits a detection of error and each group of 5 lines is protected by an EXCLUSIVE OR which permits correction of one erroneous line. The advantage of an organization of the data according to FIG. 10 is that it facilitates enormously the retrieval of the information in the decoder.

Figure 11:
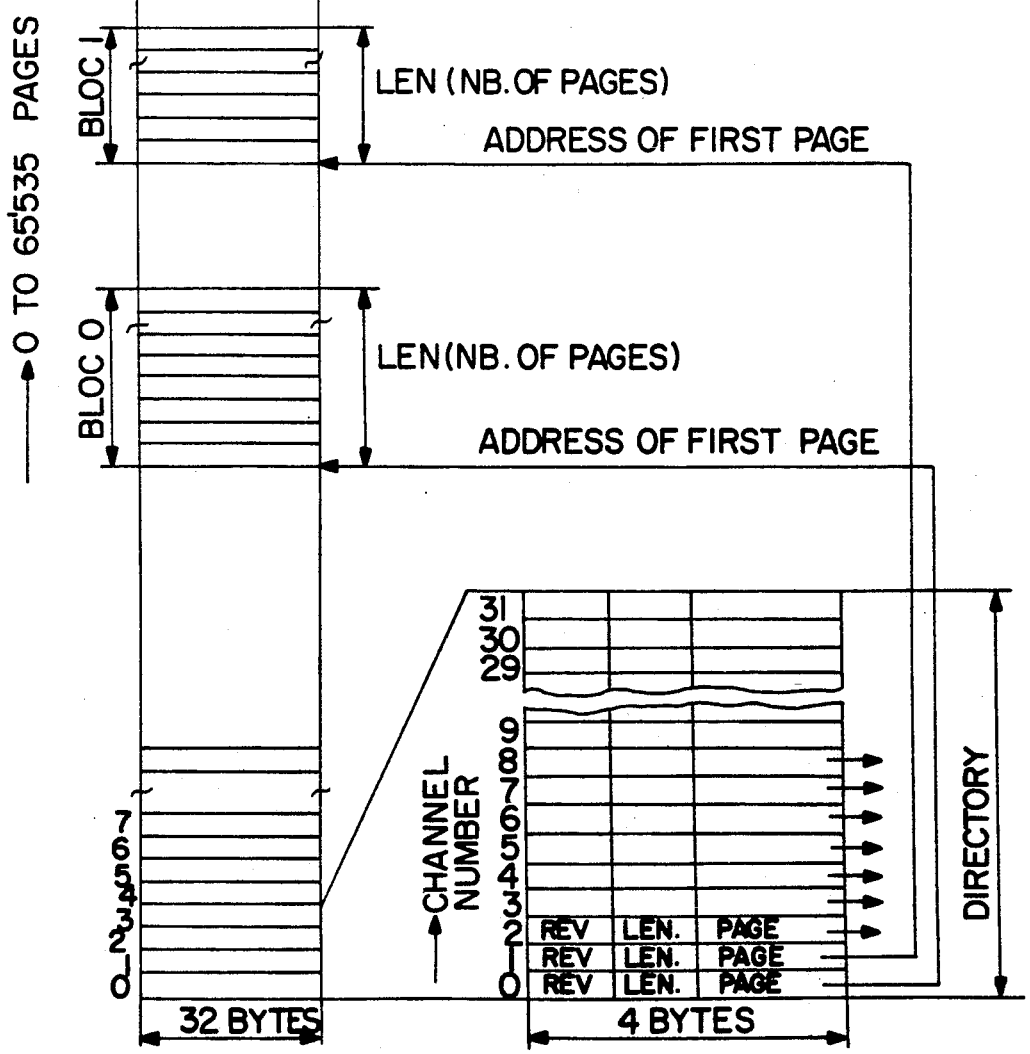
FIG. 11 shows the structure of the data in the Didon-Operating system.

As a further example, FIG. 11 shows the structure of the data in the case of the Di-OS (Didon operating system). One sees that the data is organized in 65536 pages of 32 bytes each. The four first pages (0 to 3) of the structure of the data comprise a table which delivers for each channel capable of being transmitted the address of the first page of a bloc of pages corresponding to this channel as well as the length of the bloc which is identical to the number of pages of this bloc and the number of the revisions or modifications which have been made to the bloc. The advantage of the organization according to FIG. 11 is that it leads to a versatile structure for the transmission of the data and that it permits an versatile future extension.

The preceding shows that the decoder according to the invention offers a very large number of possibilities to the user and that it facilitates more particularly the dialog with the user due to the display on the screen of the television receiver of the programs of the forecasted emissions and of the instructions which have to be executed on the keyboard for the purchase of these emissions or for reloading of credit. Moreover, the CPTV-card makes the decoder extremely effective against piracy.

We claim:

1. A decoder for a pay-TV system comprising:
   receiver means for receiving a scrambled video signal, which signal comprises information codes relating to performances to be broadcasted, and for separating said scrambled video signal and said information codes;
   a separate card connectable to said receiver means;
   means for enabling a subscriber to select at least one information code corresponding to a performance which said subscribe desires to purchase; and
   wherein said receiver means comprises first microprocessor means for storing a plurality of said information codes, for transmitting to said card information codes selected by said subscriber and for transmitting to said card an enciphered descrambling code;
   wherein said card comprises:
      an EEPROM for storing at least credit information comprising an available amount of credit and said at least one information code selected by said subscriber; and wherein said card further comprises:
      second microprocessor means for comparing the cost of a performance selected by said subscriber with said available amount of credit when said selected performance is broadcast, and, if said cost is less than said available amount of credit, for deciphering said descrambling code and supplying said deciphered descrambling code to said first microprocessor, to thereby enable said first microprocessor to use said deciphered descrambling code to descramble said scrambled video signal and deliver it to a display unit.

2. The decoder according to claim 1, further comprising a pseudo-random generator and wherein said scrambled video signal comprises a plurality of lines and wherein said video signal is scrambled by permutation of said lines and further wherein said deciphered descrambling code controls said pseudo-random generator, further wherein said pseudo-random generator delivers input pointers for a table of a plurality of descrambling keys, each pointer selecting one of said descrambling keys for use in descrambling said scrambled video signal.

3. The decoder according to claim 1, further including a memory comprising a plurality of buffers, each buffer being capable of storing an entire line of said video signal, said descrambling key being used to store each arriving line in a specific buffer in order to output from said buffer a line previously stored therein and to display said outputted line.

* * * * *